United States Patent
Bourke et al.

(10) Patent No.: US 7,111,101 B1
(45) Date of Patent: Sep. 19, 2006

(54) METHOD AND SYSTEM FOR PORT NUMBERING IN AN INTERCONNECT DEVICE

(75) Inventors: Daniel Bourke, San Francisco, CA (US); Prasad Vajjhala, San Jose, CA (US); Norman C. Chou, San Jose, CA (US)

(73) Assignee: Avago Technologies General IP (Singapore) Ptd. Ltd., Singapore (SG)

( * ) Notice: Subject to any disclaimer, the term of this patent is extended or adjusted under 35 U.S.C. 154(b) by 433 days.

(21) Appl. No.: 10/431,993

(22) Filed: May 7, 2003

(51) Int. Cl.
    *G06F 13/14* (2006.01)
(52) U.S. Cl. .................. 710/305; 710/316; 710/8; 710/243; 709/242; 709/238; 326/40; 711/163
(58) Field of Classification Search ............ None
    See application file for complete search history.

(56) References Cited

U.S. PATENT DOCUMENTS

| | | | |
|---|---|---|---|
| 5,797,036 A * | 8/1998 | Kikinis ................. | 710/38 |
| 6,839,794 B1 * | 1/2005 | Schober ............... | 710/316 |
| 6,957,312 B1 * | 10/2005 | Chou et al. ........... | 711/163 |
| 6,988,161 B1 * | 1/2006 | McConnell et al. .... | 710/316 |
| 7,010,633 B1 * | 3/2006 | Arndt et al. .......... | 710/243 |
| 7,043,569 B1 * | 5/2006 | Chou et al. .......... | 710/8 |
| 2002/0133622 A1 * | 9/2002 | Pinto .................. | 709/242 |
| 2003/0026260 A1 * | 2/2003 | Ogasawara et al. .... | 370/392 |
| 2003/0033427 A1 * | 2/2003 | Brahmaroutu .......... | 709/238 |
| 2003/0093627 A1 * | 5/2003 | Neal et al. ............ | 711/153 |
| 2003/0120852 A1 * | 6/2003 | McConnell et al. .... | 710/316 |
| 2004/0095928 A1 * | 5/2004 | O'Neill et al. ........ | 370/389 |
| 2004/0213220 A1 * | 10/2004 | Davis ................. | 370/389 |
| 2004/0264309 A1 * | 12/2004 | Stolowitz ............. | 369/36.01 |
| 2006/0006905 A1 * | 1/2006 | Chou et al. .......... | 326/40 |

FOREIGN PATENT DOCUMENTS

| | | | |
|---|---|---|---|
| JP | 03113662 A | * | 5/1991 |
| JP | 09284308 A | * | 10/1997 |

OTHER PUBLICATIONS

"Interconnecting Structure between a N Ports Switch Module and a Backplane Connector," Jan. 1, 1999, IBM Corporation, Research Disclosure, UK, vol. 42, Issue 417.*
U.S. Appl. No. 60/464,892.*
Intel—8237A High Performance Programmable DMA Controller (8237A-5).*

* cited by examiner

*Primary Examiner*—Rehana Perveen
*Assistant Examiner*—Brian Misiura

(57) ABSTRACT

A method of port numbering in an interconnect device includes loading a port configuration value from a memory device. One or more ports and subports are enabled according to the configuration value. Contiguous logical port numbers are assigned to the one or more ports and subports included in the interconnect device. A mapping request is received; and a mapped response associated with the mapping request is provided to an entity.

20 Claims, 11 Drawing Sheets

|  | Port Configuration | | | |
| --- | --- | --- | --- | --- |
| Port | x4/x1 | x1 | x1 | x1 |
| Mgmt | 0 | — | — | — |
| PORT 01 | 4 | 5 | 6 | 7 |
| PORT 02 | 8 | 9 | 10 | 11 |
| PORT 03 | 12 | 13 | 14 | 15 |
| PORT 04 | 16 | 17 | 18 | 19 |
| PORT 05 | 20 | 21 | 22 | 23 |
| PORT 06 | 24 | 25 | 26 | 27 |
| PORT 07 | 28 | 29 | 30 | 31 |
| PORT 08 | 32 | 33 | 34 | 35 |
| BIST | 36 | 37 | 38 | 39 |

Fig. 6

| PORT MODULE Configuration | PCFN$_x$[4]* | PCFN$_x$[3] | PCFN$_x$[2] | PCFN$_x$[1] | PCFN$_x$[0] |
|---|---|---|---|---|---|
| disabled | 0 | 0 | 0 | 0 | 0 |
| 4x mode | 1 | x | x | x | x |
| 1x: serdes0 enabled | 0 | x | x | x | 1 |
| 1x: serdes1 enabled | 0 | x | x | 1 | x |
| 1x: serdes2 enabled | 0 | x | 1 | x | x |
| 1x: serdes3 enabled | 0 | 1 | x | x | x |

* "x" denotes the port number (PM4C1 - PM4C8).

Fig. 7

METHOD AND SYSTEM FOR PORT NUMBERING IN AN INTERCONNECT DEVICE

FIELD OF THE INVENTION

The present invention relates generally to the field of data communications and, more specifically, to method and system for port numbering in an interconnect device.

BACKGROUND OF THE INVENTION

Existing networking and interconnect technologies have failed to keep pace with the development of computer systems, resulting in increased burdens being imposed upon data servers, application processing and enterprise computing. This problem has been exaggerated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above-described challenges, a number of new interconnect technologies are being developed. One such technology is called the InfiniBand™, and has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture (IBA) is defined in the InfiniBand™ Architecture Specification Volume 1, Release 1.1, released Nov. 6, 2002 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few. The physical properties of the IBA interconnect technology have been designed to support both module-to-module (board) interconnects (e.g., computer systems that support I/O module add in slots) and chasis-to-chasis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

SUMMARY OF THE INVENTION

A method and system for port numbering in an interconnect device are disclosed. A method of port numbering in an interconnect device comprises loading a port configuration value from a non-volatile memory device. One or more ports and subports are enabled according to the configuration value. Contiguous logical port numbers are assigned to the one or more external ports and subports included in the interconnect device.

BRIEF DESCRIPTION OF THE DRAWINGS

The present invention is illustrated by way of example and not limitation in the figures of the accompanying drawings, in which like references indicate similar elements and in which:

FIG. 6 is a table of an exemplary physical port numbering scheme, according to one embodiment of the present invention.

FIG. 7 is a table of an exemplary set of configuration codes for each port of an interconnect device, according to one embodiment of the present invention.

DETAILED DESCRIPTION

A method and system for port numbering in an interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architected system, the teachings of the present invention may be applied to any interconnect device within any interconnect architecture.

Figure 2A:
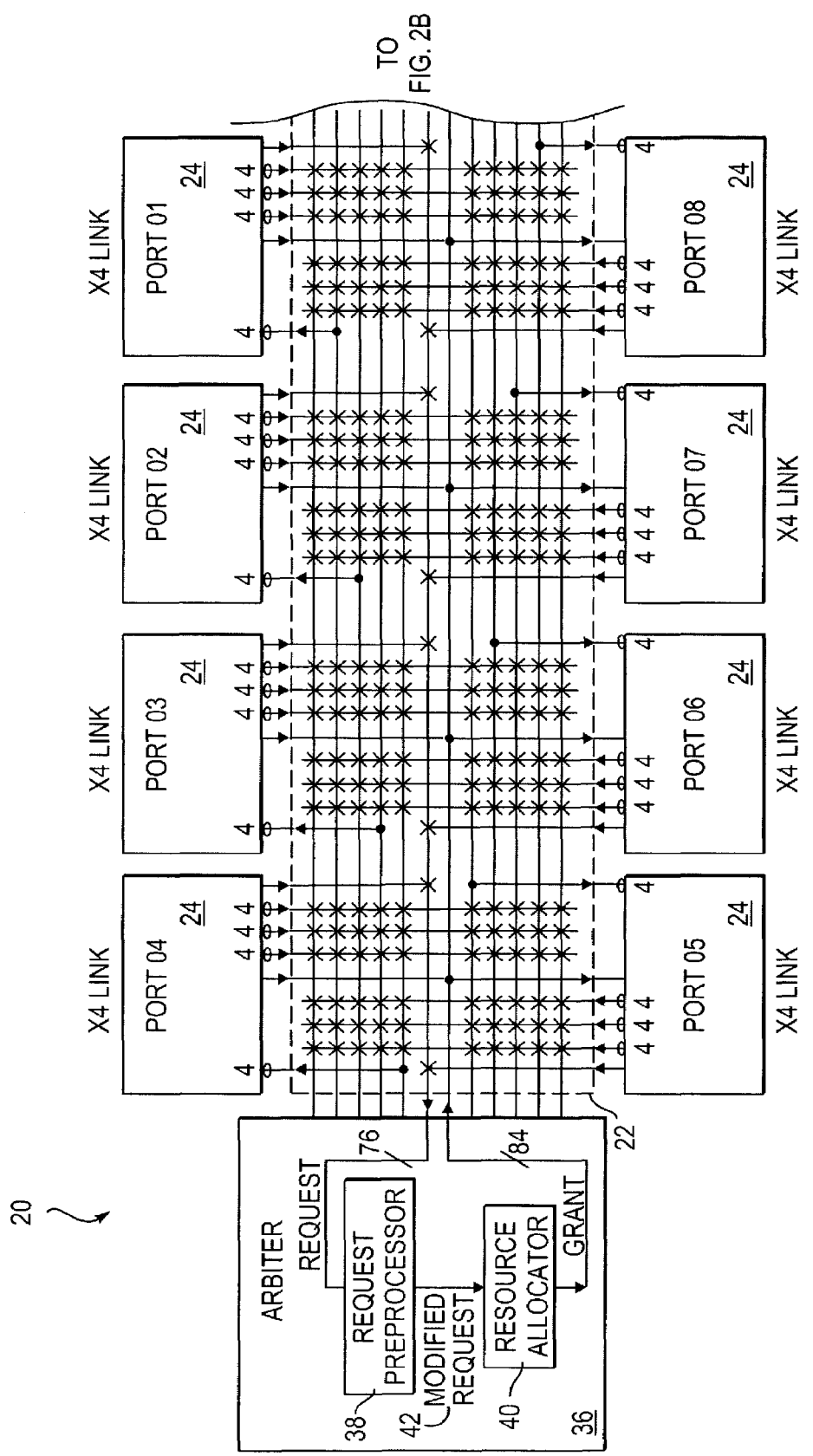
FIGS. 2A and 2B provide a diagrammatic representation of a data path, according to an exemplary embodiment of the present invention, implemented within an interconnect device (e.g., a switch).
Figure 2B:
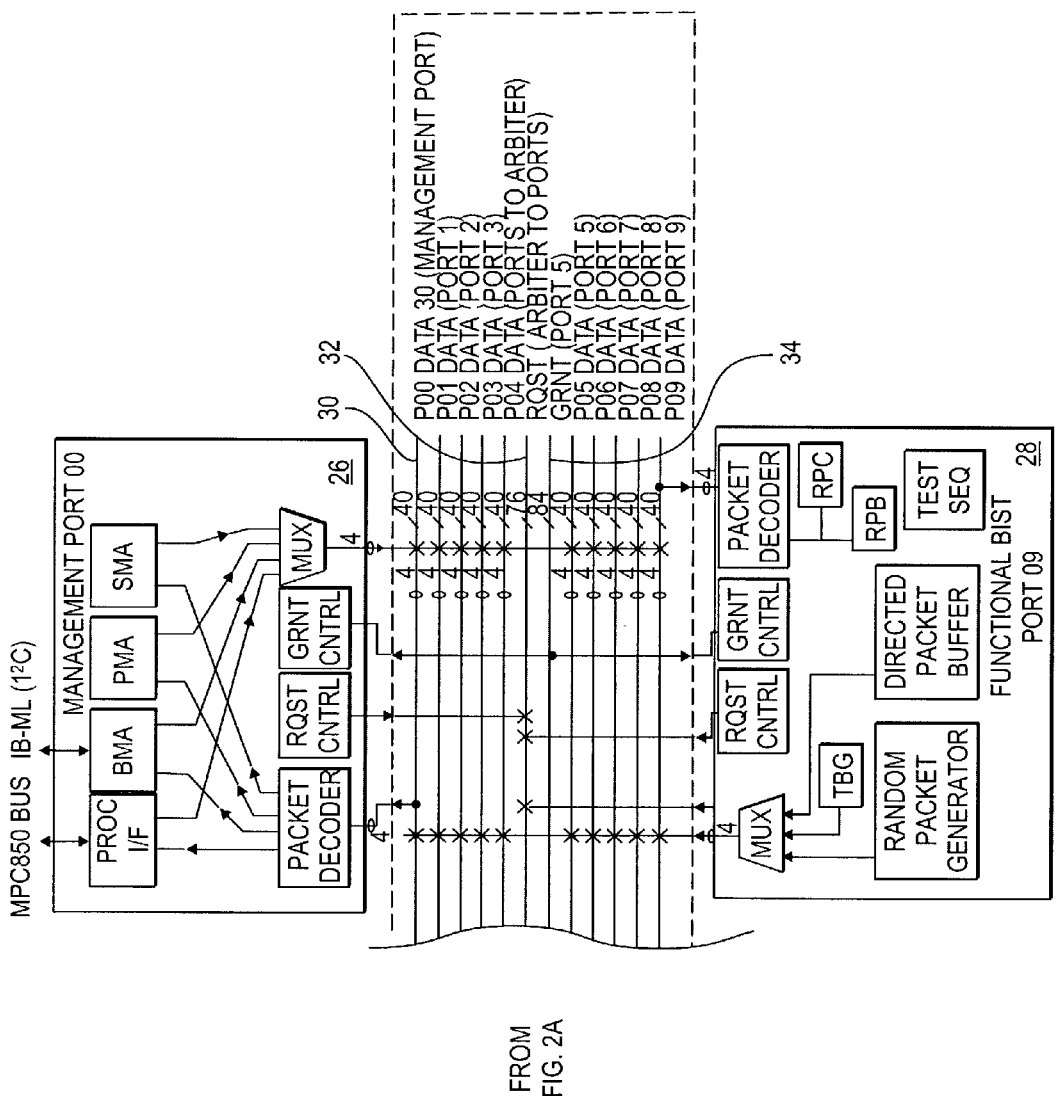

FIGS. 2A and 2B provide a diagrammatic representation of a datapath 20, according to an exemplary embodiment of the present invention, implemented within an interconnect device (e.g., a switch). The datapath 20 is shown to include a crossbar 22 that includes a 104-input by 40-output by 10 bit data buses 30, a 76 bit request bus 32 and a 84 bit grant bus 34. Coupled to the crossbar 22 are eight communication ports 24 that issue resource requests to an arbiter 36 via the request bus 32, and that receive resource grants from the arbiter 36 via the grant bus 34.

The arbiter 36 includes a request preprocessor 38 to receive resource requests from the request bus 32 and to generate a modified resource request 42 to a resource allocator 40. The resource allocator 40 then issues a resource grant on the grant bus 34. Further details regarding the arbiter 36 will be discussed in detail below.

In addition to the eight communication ports, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

The functional BIST port 28 supports stand-alone, at-speed testing of an interconnect device embodying the datapath 20. The functional BIST port 28 includes a random packet generator, a directed packet buffer, a return packet buffer, a table generator, a request controller, a grant controller, a test sequencer and a return packet checker.

Figure 3:
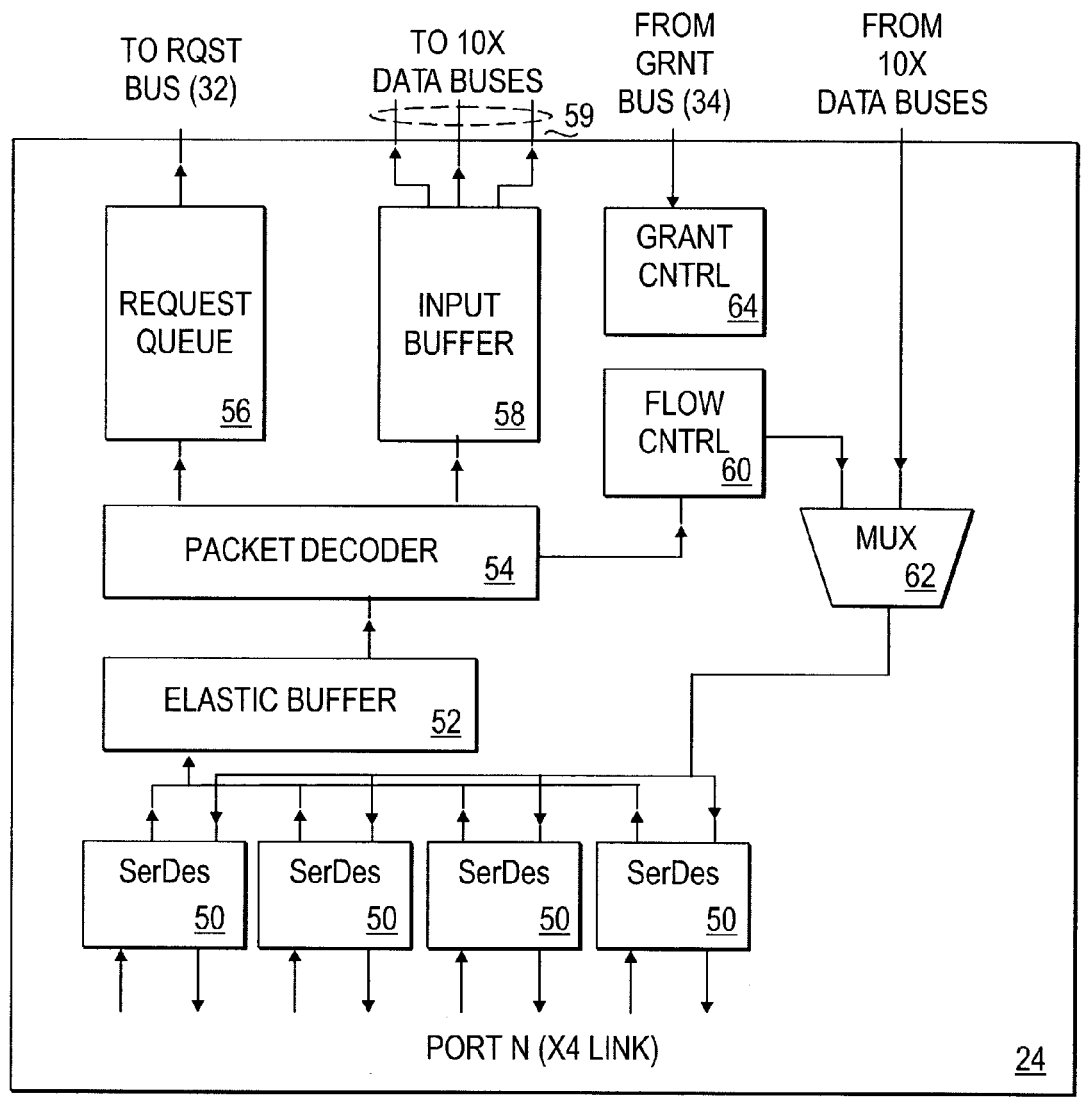
FIG. 3 is a diagrammatic representation of communications port, according to an exemplary embodiment of the present invention, that may be employed within a data path.

Turning now to the communication ports 24, FIG. 3 is a block diagram providing further architectural details of an exemplary communications port 24 as may be implemented within the datapath 20. While the datapath 20 of FIGS. 2A and 2B are shown to include eight 4× duplex communication ports 24, the present invention is not limited to such a configuration. Referring specifically to FIG. 3, each communications port 24 is shown to include four 8-bit registers Serializer-Deserializer circuits (SerDes's) 50 via which, when in 4× mode, 32-bit words are received at and transmitted from a port 24. In 1× mode, each SerDes 50 acts as a separate full-duplex port receiving and transmitting. Each SerDes 50 operates to convert a serial, coded (8B10B) data bit stream into parallel byte streams, which include data and control symbols. Data received via the SerDes' 50 at the port 24 is communicated as a 32-bit word in 4× mode and a 8-bit word in 1× mode to an elastic buffer 52. The elastic buffer 52 has two primary functions, namely:

(1) To accommodate frequency differences (within a specified tolerance) between clocks recovered from an incoming bit stream and a clock local to the data path 20; and (2) To accommodate skew between symbols being received at the data path 20 on four serial data channels.

Incoming data is further synchronized with a core clock as it is propagated through the elastic buffer 52.

Figure 4:
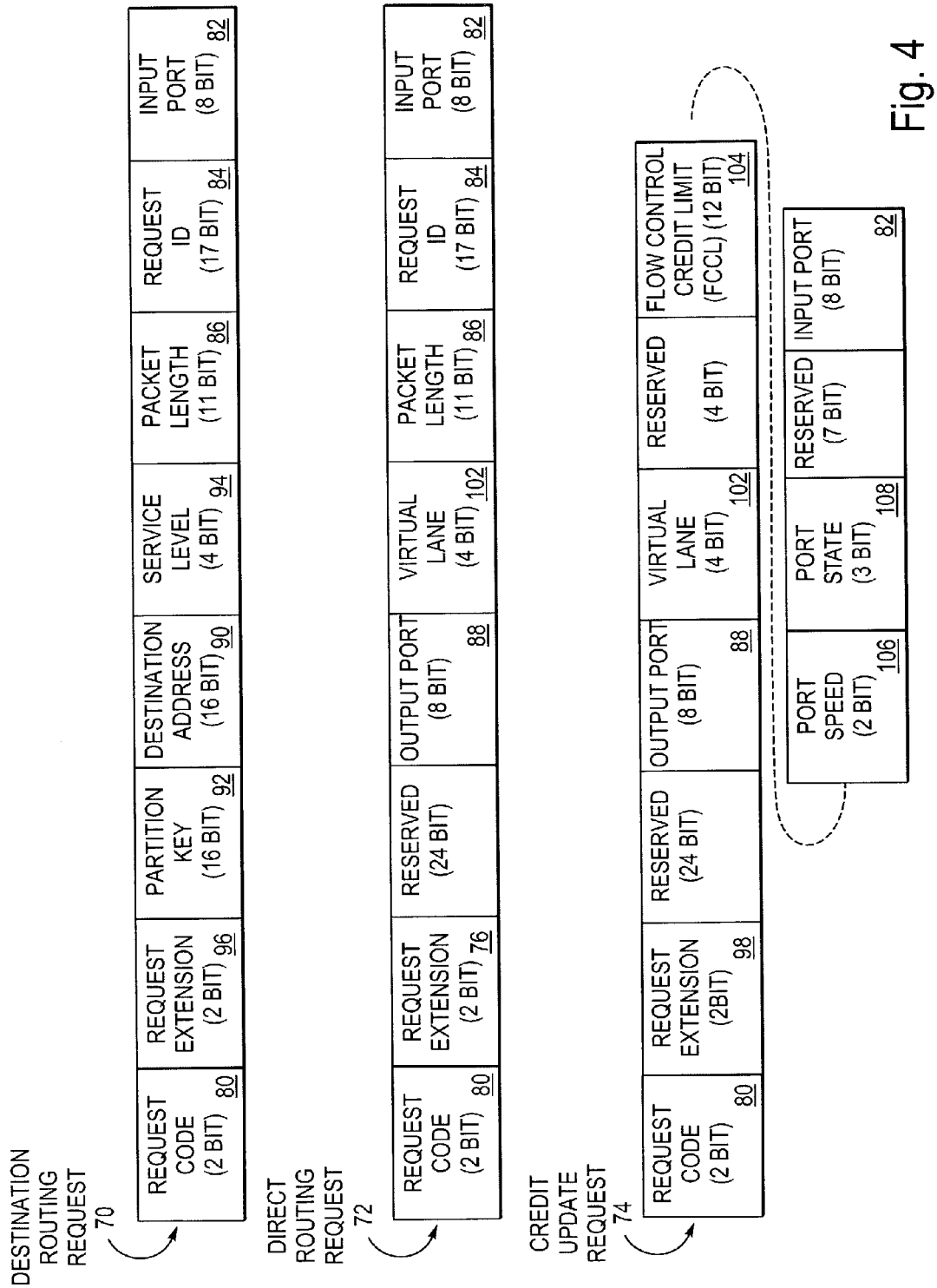
FIG. 4 illustrates two examples of packet transfer requests, namely a destination routing request and a direct routing request.

From the elastic buffer 52, packets are communicated to a packet decoder 54 that generates a request, associated with a packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 4 illustrates two examples of packet transfer requests, namely a destination routing request 70 and a direct routing request 72. An exemplary credit update request 74 is also shown. These requests will be discussed in greater detail below.

Returning to FIG. 3, each communications port 24 is also shown to include a 20 Kbyte input buffer 58, the capacity of which is divided equally among data virtual lanes (VLs) supported by the datapath 20. In alternate embodiments, the capacity of the input buffer 58 can be divided unequally among the VLs. Virtual lanes are, in one embodiment, independent data streams that are supported by a common physical link. Further details regarding the concept of "virtual lanes" is provided in the InfiniBand™ Architecture Specification, Volume 1, Nov. 6, 2002.

The input buffer 58 of each port 24 is organized into 64-byte blocks, and a packet may occupy any arbitrary set of buffer blocks. A link list keeps track of packets and free blocks within the input buffer 58. Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the Ser Des 50 to other ports 24. Further details regarding an exemplary credit-based flow control are provided in the InfiniBand™ Architecture Specification, Volume 1.

The communications port 24 also includes a grant controller 64 to receive resource grants 180 from the arbiter 36 via the grant bus 34.

Returning to FIG. 4, within the routing requests 70 and 72, a request code 80 is a 2-bit value identifying the request type, an input port identifier 82 identifies a port 24 from which the request was issued, a request identifier 84 is a "handle" or identifier for a request that allows the grant controller 64 of a port to associate a grant with a specific packet. For example, the request identifier 84 may be a pointer to a location within the input buffer 58 of a communications port 24. The request identifier 84 is necessary as a particular port may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packets should be directed. In lieu of an output port identifier 88, the destination routing request 70 includes a destination address 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subnet management packet (VL15), a raw (e.g., non-Infiniband) packet, or a standard packet where the partition key is valid/invalid.

The exemplary credit update request 74 includes a port state identifier 108 that indicates whether an associated port, identified by the port identifier 100, is online. A port speed field 106 identifies the port's transmit speed or link width (e.g., 12×, 4×, 1×, or 0). Each credit update request 74 also includes a virtual lane identifier 102, a request extension 98 and a flow control credit limit 104.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) the remote receiver is capable of receiving (or 2048 if the number exceeds 2048) on the given virtual lane.

Arbiter

Figure 5:
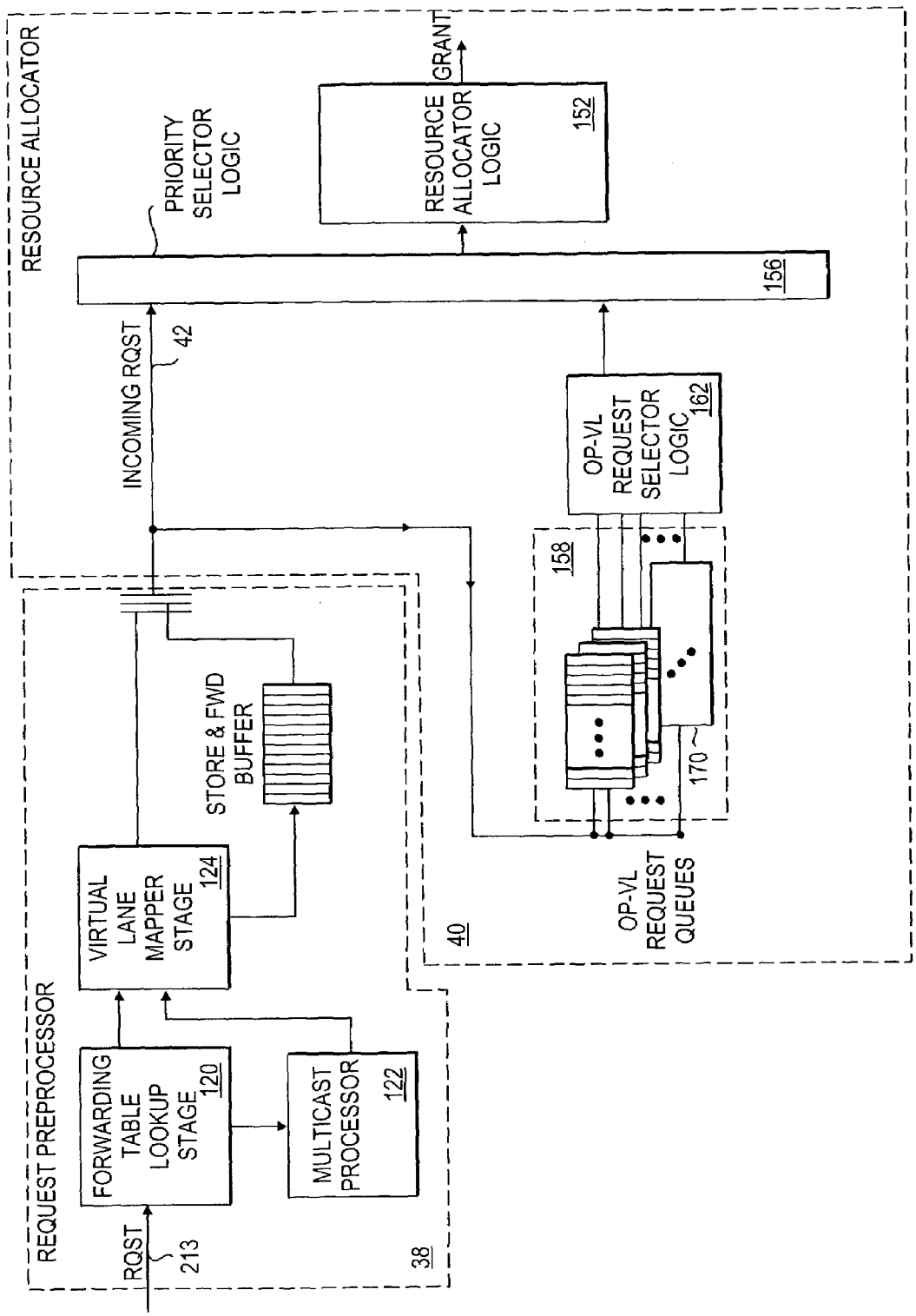
FIG. 5 is a conceptual block diagram of an arbiter, according to an exemplary embodiment of the present invention.

FIG. 5 is a conceptual block diagram of the arbiter 36, according to an exemplary embodiment of the present invention. The arbiter 36 is shown to include the request preprocessor 38 and the resource allocator 40. As discussed above, the arbiter 36 implements a central arbitration scheme within the datapath 20, in that all requests and resource information are brought to a single location (i.e., the arbiter 36). This offers certain advantages in that a central, consolidated view of resource availability and demand allow efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival with a rate of less than one packet per clock cycle. Again, in deployments where the average packet arrival rate is greater than one packet per clock cycle, the teachings of the present invention may be employed within an arbiter that implements parallel arbitration. The arbiter 36 includes routing tables for routing requests.

Dealing first with the request preprocessor 38, a request (e.g., a destination routing, direct routing or credit update request 70, 72 or 74) is received on the request bus 32 at a routing stage 120 that includes both unicast and multicast routing tables. If the destination address is for a unicast address, the destination address 90 is routed to an output port number. On the other hand, if the destination is for a multicast group, a multicast processor 122 spawns multiple unicast requests based on a lookup in the multicast routing table. More details regarding the population of the routing tables is provided below.

From the routing stage 120, a request is forwarded to a virtual lane mapper stage 124 where a request's service level identifier 94, input port identifier 82 and output port identifier 132 (determined at stage 120) are utilized to perform a lookup in a virtual lane map (not shown) and to output a virtual lane identifier.

Accordingly, the output of the request preprocessor 38 is a modified request that is derived from a request, such as any of those shown in FIG. 4. This modified request 42 is provided to the resource allocator 40 which generates grants that instruct and allow packets to be sent out the device 20.

Dynamic Port Configuration

Interconnect device 20, in one exemplary embodiment, implements dynamic port configuration. For example, interconnect device 20 can be configured as a 32 by 1× port device. Any combination of ports can be achieved up to 32 ports. For example, alternate configurations include an 8 by 4× port device, 4 by 1× port device, 1 by 4× port device, etc. Each communication port 24 can be used as a 4× port or four 1× ports, in order to implement the dynamic port configurations. Thus multiple configurations are possible, however the configuration of interconnect device 20 is static once booted and will not be changed dynamically during operation of the interconnect device 20. FIG. 6 illustrates a data table of an exemplary physical port numbering scheme, according to one embodiment of the present invention. Management Port 26 of FIG. 2B is assigned the internal static physical number of 0. BIST port 28 is assigned the internal static physical number of 36. Ports 24 of FIG. 2A are numbered 4–35. If Port 01 is configured as 4×, then it is numbered 4. If Port 01 is configured as four 1× ports then each SerDes 50 (as shown in FIG. 3) is numbered 4–7. Ports 02–08 are appropriately numbered according to the table depending on the desired configuration. Having described the physical port numbering of interconnect device 20, the configuration coding for each port will now be described.

FIG. 7 is a table of an exemplary set of configuration codes for each port of interconnect device 20, according to one embodiment of the present invention. Each configuration code is 5-bits long (PCFN [0]–PCFN [4]). Furthermore, there is one configuration code for each port module 24. If the entire port module is to be disabled, the $PCFN_x$ configuration code is 00000. The $PCFN_x$ [4] bit indicates if port module 24 is configured to operate in 4× mode. The subscript "$_x$" in $PCFN_x$ [4] may be any value from 1–8, corresponding to Port Modules 1–8. The symbol "x" occupying many of the cells of the table of FIG. 7 signifies a "don't care value", that is that the bit value can be set to either 0 or 1. $PCFN_x$ [0]–$PCFN_x$ [3] function to enable or disable SerDes 0—SerDes 3 when port module 24 is configured to operate in 4 by 1× mode. $PCFN_x$ [0] corresponds to the base SerDes (Subport 50) in a port module 24. In 4 by 1× mode PCFNx [0] has the base physical port number for that quad port module 24, i.e., the equivalent 4× port number. These configuration codes are stored in non-volatile random access memory (NVRAM). Thus, no mapping tables are necessary to be generated in a RAM by the NVRAM. With these configuration codes, combinational logic is used, as shown in FIG. 8 to perform the mapping.

Figure 1:
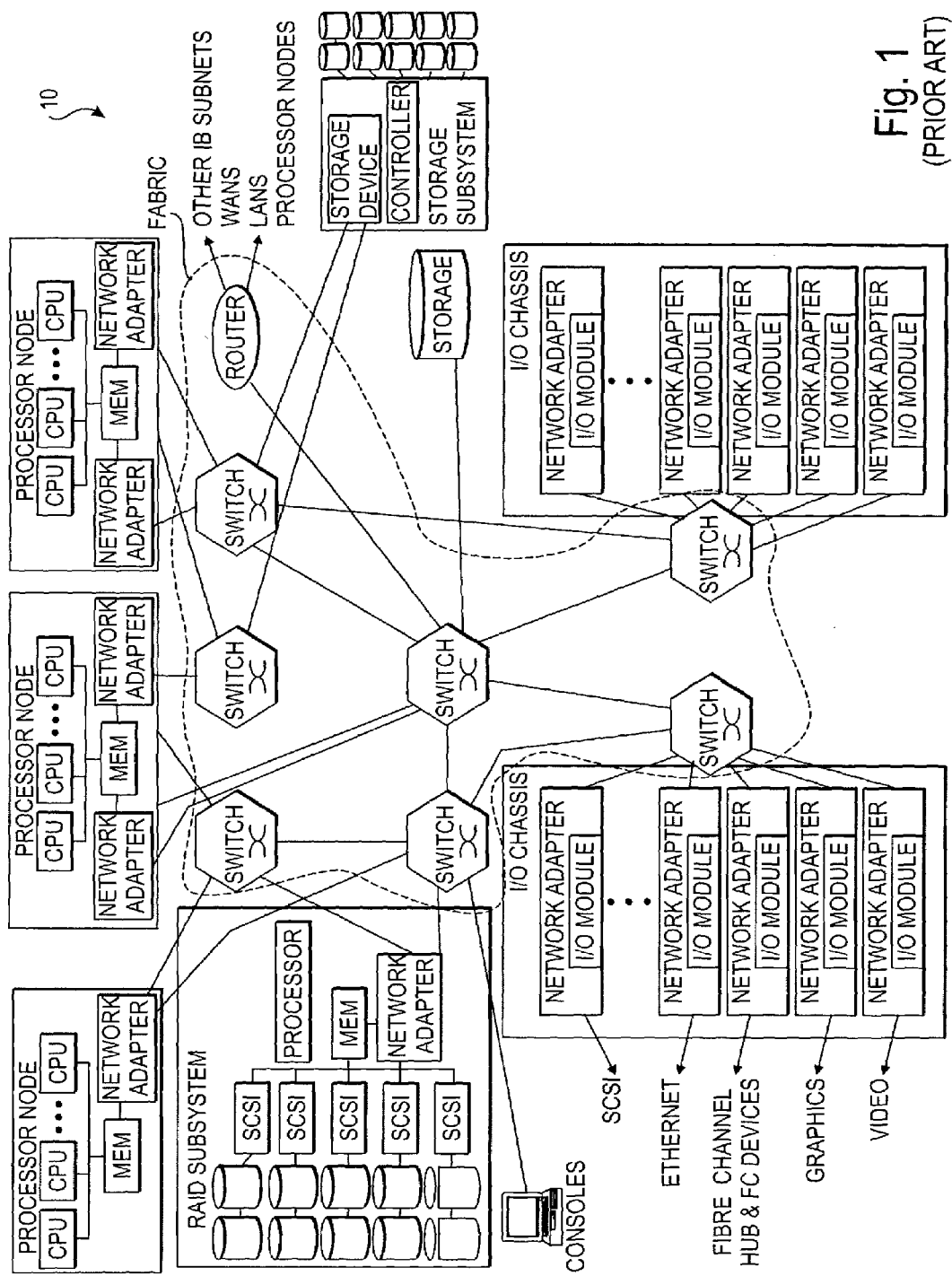
FIG. 1 is a diagrammatic representation of a System Area Network, according to the prior art, as supported by a switch fabric.
Figure 8:
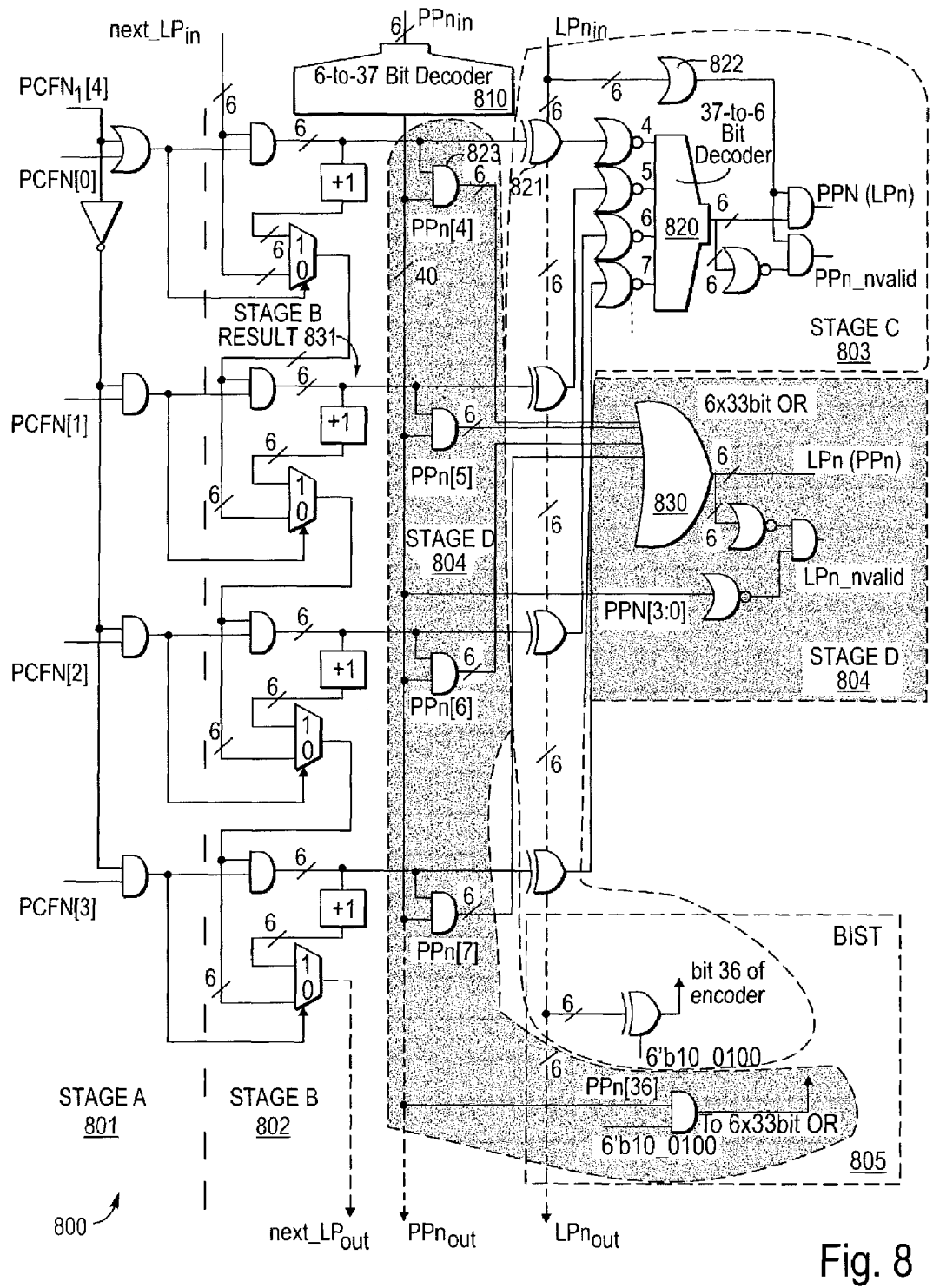
FIG. 8 illustrates a schematic diagram of an exemplary logical-physical port mapper, according to one embodiment of the present invention.
Figure 9:
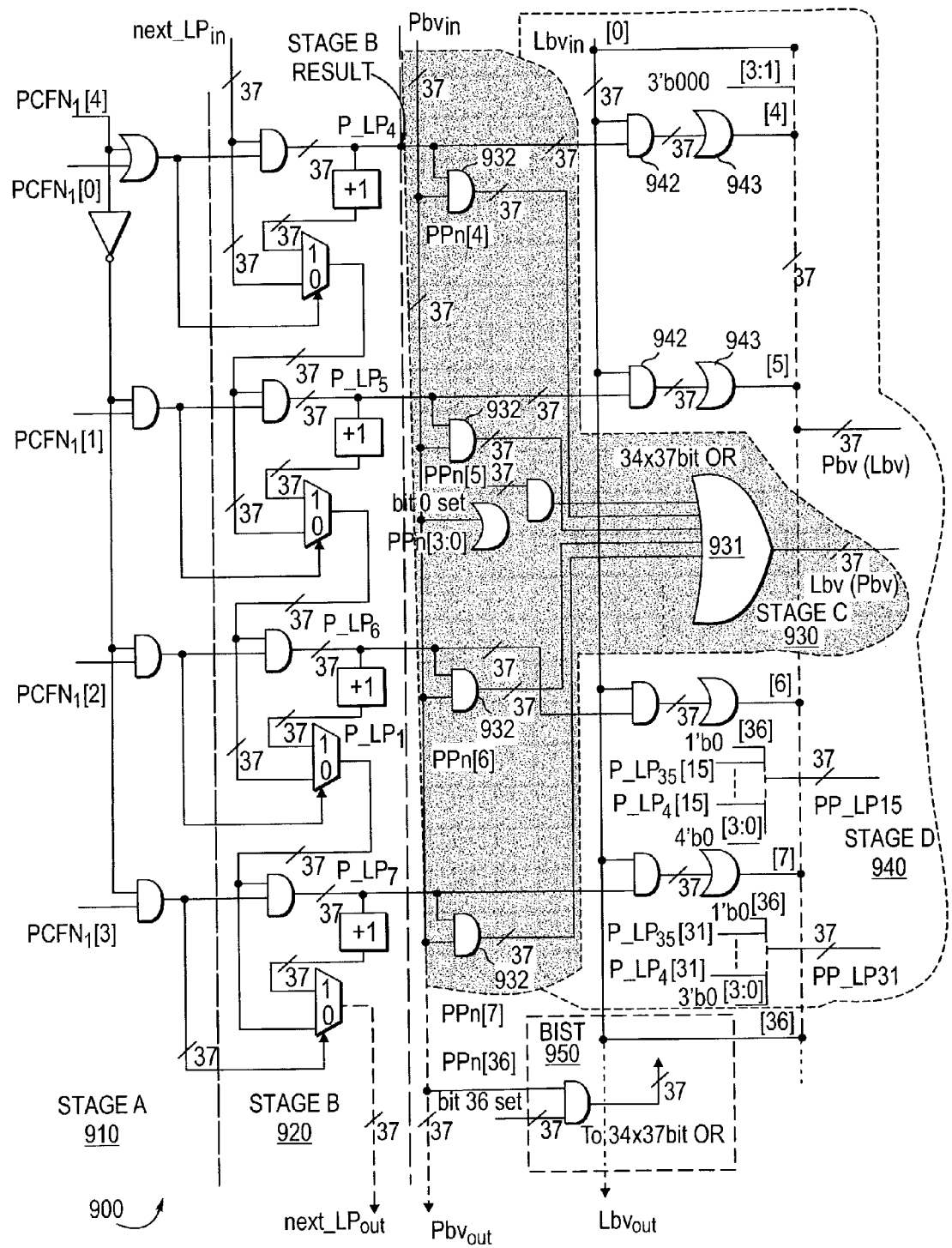
FIG. 9 illustrates a schematic diagram of an exemplary multicast bit vector mapper according to one embodiment of the present invention.

Before describing the mappers of FIGS. 8 and 9, a description of why, when and how they are used is presented. As discussed above, in an IBA packet networking system such as that shown in FIG. 1, packets are transmitted via two types of routing requests, those being a Direct Routing packet 72 and a Destination Routing packet 70. Direct packets 72 are restricted to Subnet Management traffic Packets (SMPs). With Direct Routing Requests, the direct-route packet 72 contains all the information necessary to route the packet from a source node, through intermediary nodes, to a destination node, via a specified path. The specified path is determined by using the initial path field in conjunction with the Hop counter and Hop pointer field of the common mad header of the packet header. With destination routing packets 70, only a destination Local identification (DLID) is specified. When a destination routing packet 70 is received at an intermediary node, a routing table within the node must be referenced to determine where to route the packet to get closer to the destination node. This routing table within each node is written by an IBA defined software entity called a subnet manager. The Subnet manager (SM) is responsible for the initial exploration of the network topology. The SM is also responsible for initializing the network to provide routing paths between end nodes. Initialization includes assigning unique local identifiers (LIDs) to all end nodes in the fabric, activating ports, writing Routing tables, service level (SL) to VL tables, and VL arbitration tables. The SM utilizes SMPs for initialization, the use of directed route packets is necessary for network initialization at least until LIDs have been allocated and routing tables have been setup. To write each switch's routing tables, the SM sends SMPs containing the relevant routing information to each node on the network.

The routing table is in the form of a lookup table, which is indexed by a LID address. A switch 20 receiving a destination route packet 70, extracts the destination local identifier (DLID) field from the Local route header(LRH) of the incoming packet. The arbiter 36 does a lookup of the routing table by indexing into the table based on the packet's DLID and extracts an output port that the packet 70 will be sent out on from this switch.

For example, if a packet is being sent to an end node with a LID of 0x0004, then the packet will have a DLID of 0x0004. When this packet is received at an intermediary switch node then the arbiter 36 in the intermediary node looks-up (in the routing table), which output port of the intermediary node corresponds to DLID=0x0004. The output port extracted from the routing table determines which port that packet will be sent out on. The network's SM is responsible for setting up the routing tables correctly to guarantee that required routing paths are available.

With configurable nodes such as interconnect device 20, a variable number of output ports can be configured, as discussed above. IBA requires that the ports on a switch, such as interconnect device 20, be numbered contiguously. Thus, what an SM perceives as a specific output port on a switch, may not coincide with the physical port interpretation that the switch internally perceives.

The physical representation of ports that is used in the internal chip architecture will not correspond to the logical world's view. For example, with the physical external ports' numbering starting with 0x04, a SM may see that the third output port on a switch connects to an end node with LID=0x0004. However, port number 3 as seen by the SM, would be seen as a different physical port number by the internal switch architecture. For example if the port was configured as an 8 by 4x switch then using the table of FIG. 6, port number 3 would correspond to physical port number 12.

The SM when it populates routing tables only has a concept of logical port numbers. Therefore, the Subnet Management Agent (SMA) within the configurable switch 20, deals with the requests to populate the routing table by performing logical to physical port mapping. The mapping converts the logical port numbers to physical port numbers before populating the routing tables in the switch 20. Also when the SM performs reads of the routing tables, the SMA must perform physical to logical port number mapping so that the SMP contains logical port numbers. It is evident from above, that the SM does not need to be aware of the physical numbering system employed internally by the switch. The SM deals only with logical numbers. Within the switch the main switching function utilizes physical port numbers. The SMA provides the transpose function between the logical and physical numbering schemes.

It should be noted that the relationship between logical and physical port numbering is not arbitrary but is defined by the port configuration information code (PCFN) that is loaded at boot time from NVRAM, as discussed above. The SMA utilizes the port mappers discussed in connection with FIGS. 8 and 9 below, to provide the logical to physical and physical to logical transpose. The mappers take the port configuration input from NVRAM to create a static logical to physical relationship. The mapper takes either a logical or physical port number and outputs a physical or logical port number respectively.

IBA packets can also be multicast. Multicast implies that one packet can spawn multiple packets to reach multiple destinations. IBA switches can contain multicast routing tables. Multicast packets are designated by a specific range of DLIDs. Unlike destination routing where the DLID specifies a single end node, a multicast DLID can result in multiple end nodes receiving the packet. The multicast packets are treated similarly to unicast destination routed packets in a switch. However the multicast DLID does not do a look up on the linear forwarding table, instead the multicast routing table (MRT) is used for the lookup. The MRT is also indexed by DLIDs. IBA provides a multicast LID range which is 0xC000–0xFFFE. A switch receiving a multicast packet indexes the MRT and extracts a bit vector which signifies which ports to send the packet out on. The difference (relative to the unicast routing) is that the bit vector can indicate that the packet is sent out on multiple ports. The SM is responsible for populating the MRT. Again the MRT has no concept of physical port numbers and only deals with logical port numbers. As a result the SMA must transpose any logical bit vectors to be written into the MRT to physical bit vectors before being written into the MRT in the switch. The switch requires that the bit vectors be in physical numbering scheme so as to know which port to send the packet out on. For example, if the port is configured as a 8 port 4x switch and the MRT entry for DLID 0xc001 has bit 1 and bit 8 set, i.e. any packet entering the switch with DLID=0xc001 should exit on logical port 1 and logical port 8. The SMA would use the bit vector mapper to map this to a bit vector that has bit 4 and bit 32 set as physical port 4 corresponds to logical port 1 in a switch configured as 8 by 4x. Furthermore, physical port 32 corresponds to logical port 8.

Again it should be noted that the SM has no knowledge of any physical port numbering system being utilized in the switch. The SMA within the switch provides the transpose point between the two number systems. It should be noted that the SMA does the reverse transpose when the SM is reading entries from the MRT. The details of the mappers mentioned above will be described now in connection with FIGS. 8 and 9.

FIG. 8 illustrates a schematic diagram of an exemplary logical-physical port mapper 800, according to one embodiment of the present invention. The mapper 800 is repeated for each port module 24. In one embodiment, the mapper 800 resides within request preprocessor 38.

According to one embodiment, physical port mapper 800 inputs a 8 by 5-bit PCFN configuration code, as well as a 6-bit logical port value, (LPn$_{in}$ (LP$_n$)) and outputs a 6-bit physical port value (PP$_n$ (LP$_n$)). The 6-bit physical port value identifies a port module 24 and specific subport (Ser Des) 50, according to the physical port numbering table of FIG. 6. Additionally, port mapper 800 can take a physical port number (PP$_{in}$) as an input with the PCFN configuration value and next_LP$_n$, and outputs a 6-bit logical port number (LP$_n$(PP$_n$)). The PCFN and next_LP$_{in}$ set up the static physical/logical mapping. PPn$_{in}$ is mapped to LP$_n$(PP$_n$) and LP$_{in}$ is mapped to PP$_n$(LP$_n$).

At stage A 801, mapper 800 determines if the port module 24 is configured for 1–4× mode or 4–1× mode and which subports 50 are enabled. At stage B 802, mapper 800 assigns a logical port number to all enabled port modules 24, including subports 50. Since logical port numbers (LP$_n$) are contiguous, and range in value from 0 to 36 (where 0 signifies the management port 00, and 36 signifies the BIST port 28), the first "next_LP$_{in}$" value for the interconnect device 20 is 1. If a physical port is assigned a logical port number (i.e., the port is enabled) then the "next_LP$_{in}$" value is incremented. As logical port numbers are assigned the "next_LP$_{in}$" value is incremented.

Stage C 803 uses the assignments of stage B 802, with a logical port number (LPn$_{in}$) to determine a physical port number (PPn(LPn)) associated with the LPn$_{in}$ value. The 6-bit values 831 provided by stage B 802 are exclusively bitwise "OR"eud ("XOR" 821) with the logic port number (LPn$_{in}$) 6-bit input value. A reduction "NOR" operation is performed, for example, if all 6-bits are 0, then the reduction "NOR" returns a single bit value of 1. This result will only occur with the one physical port whose high bit position matches the correct logical port number (i.e., the logical representation in stage B 802 matches LPn$_{in}$. A 37 to 6 Bit encoder provides the correct physical port number corresponding to the high bit position in the 6-bit word 831. In the cases where an LP$_{in}$ value has no match, the PPn (LPn) value returned will be 0, however, since the management port is 0, these values should be invalidated as follows. Reduction "OR" gate 822 results in a high value for all LPn$_{in}$ values except for management port 0. The 6-bit encoded signal is reduction "NOR"ed and then "AND"ed with the value from "OR" gate 822. Thus, in cases where the PPn(LPn) value is 0 and the LPn$_{in}$ value is 0 as well, PPn_nvalid is 0, signifying a valid physical port mapping. However, if the PPn(LPn) value is 0 and the LPn$_{in}$ value is not 0, the PPn_nvalid is 1, signifying an invalid logical port. The LPn$_{in}$ value was applied to the mapper. BIST stage 805 handles LPn$_{in}$ values of 36 and passes that value to be "XOR"ed with the 6-bit binary value for 36 (i.e., 10_0100). The result is "NOR"ed and provided to the 37-to-6 Bit Encoder.

Stage D 804 performs the mapping of a physical port number (PPn$_{in}$) to a logical port number (LPn(PPn)). The 6-bit results from stage B 802 are "AND"ed with the decoded PPn$_{in}$ value (taken from the 6-to-37 Bit Decoder). The 6-to-37 bit decoder operates as follows, if PPn$_{in}$=4 and has a 6-bit binary value of 00_0100, then its 37 bit decoded value is 00,0000,0000,0000,0000,0000,0000,0000,0001,0000, where "1" occupies the bit 4 position. In this example, bit 4 is bitwise "AND"ed with each bit of Stage B result 831. A bitwise "OR" is performed by 6×33 bit "OR" gate 830 which outputs the desired logical port number (LPn(PPn)) associated with the PPn$_{in}$. Continuing with the example where PPn$_{in}$=4 and if Stage B 802 assigns SerDes 0 50 of Port 01 (which corresponds to PPn$_{in}$=4) to logical port 1, then the value out of stage B 802 is 1 and PPn [4] is 1. After performing a 6-bit bitwise "AND", "AND" gate 823 outputs the 6 bit value 000001 which, when "OR"ed with 32 other 6-bit 0 values (i.e., 000000) results with LPn(PPn)=00_0001.

In a case where PPn$_{in}$ is 0–3 (corresponding to the management port) and LPn(PPn)=0, then LPn-nvalid=0, and a LPn(PPn) is valid. If LPn (PPn)=0 but PPn[3:0] is nonzero then LPn_nvalid=1 and the LPn (PPn)=0 value is discarded as invalid. BIST stage 805 handles PPn$_{in}$ values as in stage D 804 by "AND"ing the decoded PPn$_{in}$ value with binary 36 (i.e., 10_0100). In such a case 10_0100 is passed to "OR" gate 830 and LPn(PPn)=10_0100, signifying the BIST port 28.

Stage A 801 and Stage B 802 are replicated for all 8 port modules of interconnect device 20. Stage C 803, Stage D 804, and BIST Stage 805 have one instance per mapper. The functionality of each stage can be localized in the preprocessor 38 or distributed throughout the interconnect device 20. The mapper can be utilized in any section of the device 20, however, in the present example the mapper is utilized in the management port 26 and preprocessor 38. In addition to supporting the logical and physical port mapping, the interconnect device 20 performs multicast bit vector logical and physical ports mapping.

FIG. 9 illustrates a schematic diagram of an exemplary multicast bit vector mapper 900 for logical and physical mapping, according to one embodiment of the present invention. The multicast bit vector logical to Physical mapper 900 converts a logical multicast bit vector LBv$_{in}$ received in an SMP (Subnet Management Packet) to a physical bit vector Pbv(Lbv) that can be used in interconnect device 20. In one embodiment, the port mapper 900 will be implemented in the pre-processor 38.

The operation of the multicast bit vector mapper 900 is similar to the combinatorial port mapper 800. The configuration information PCFN[63:24] is booted from NVRAM at boot time and stored locally in the multicast mapper 900. This physical configuration information is used in the static stage of the port mapper 900 to generate physical-logical mapping relationships. Unlike the port mapper 800 this physical-logical mapping transpose information is stored in decoded form rather than encoded format.

The MRT is accessed by the SM using SMPs in blocks of 32 PortMask entries. Each SMP access to the MRT is also limited to a position of a PortMask entry. Each PortMask entry is 16 bits wide. The PortMask entry zero accesses the PortMask entry for Port number 0 to Port number 15. If a switch has more than 15 ports then to fully program each Multicast LID then two or more SMP accesses are required. As discussed before, the SM programs the MRT with a logical bit vector, as the internal chip numbering system works on a physical number scheme, then the SMA must transpose this logical bit vector to a physical bit vector before writing the MRT. Reads of the MRT require that physical to logical bit vector mapping be performed. It should also be noted that as the SMP access can only access one 16 bit PortMask position at a time, therefore the entity doing the access to the MRT should only write and read the correct slice of the MRT when doing MRT accesses. The MRT slice being accessed is determined from the position bits of the AttributeModifier field of the Common Mad header of the SMP.

To generate a Physical bit vector from a logical bit vector the pre-processor 38 drives the appropriate 16-bit PortMask slice of the logical bit vector onto the LBv$_{in}$ inputs of the port mapper 900 depending on the 16-bit PortMask slice addressed by the SMP MRT access address. The pre-processor 38 drives zeros on all other bits of $LBv_{in}$. This input is bitwise "AND"ed with the logical representation of the physical port and the output is driven to a reduction "OR", so if there is match on any bit then this physical port is selected in the physical bit vector.

At stage A 910, vector mapper 900 determines the configuration of the ports 24 and subports 50. Ports 24 can be configured for 1 by 4× mode or 4 by 1× mode with all or some of subports 50 enabled. At stage B 920, vector mapper 900 assigns a logical port number to all enabled port modules 24 and subports 50, as described above in connection with mapper 800. However, $next\_LP_{in}$ is a decoded 37 bit value. Each bit position in the $next\_LP_{in}$ vector represents a logical port.

Stage C 930 uses the assignments (P_LP [4:36]) of stage B 920, with a physical bit vector input ($Pbv_{in}$) to generate a logical bit vector output (Lbv (Pbv)). P_LP[4:36] are bitwise "AND"ed with the appropriate bit of the $Pbv_{in}$ bit vector, PPn[4:36] at "AND" gates 932, resulting with the actual logical bit vector for that physical bit (representing physical port or subport). Logical bit vectors (each 37-bits long) are generated from "AND" gates 932. These 34 logical bit vectors are "OR"ed together at "OR" gate 931), to generate Lbv (Pbv) which is 37 bits long.

Stage D 940 performs the mapping of a logical bit vector ($Lbv_{in}$) to a physical bit vector (Pbv (Lbv)). Stage D 940 uses the assignments P_LP [4:36] of stage B 920 with $Lbv_{in}$ to generate Pbv (Lbv). The vectors P_LP[4:36] are "AND"ed with $Lbv_{in}$ at "AND" gates 942. Each output of gates 942 are reduced using reduction "OR" gates 943 to generate the 37 physical bit vector Pbv (Lbv).

BIST stage 950 maps bit 36 of a logic bit vector to a physical bit vector, as well as mapping bit 36 of a physical bit vector to a logical bit vector. In connection with the mapping of management port 26, logic bit vector's bit position 0 is mapped directly to physical bit vector's, bit position 0. Bit positions 1:3 of Pbv (Lbv) are set to 0 There are two other outputs of this mapper, PP_LP15 and PP_LP31. These outputs can be used by the entity accessing the MRT to identify the physical port boundaries of the PortMask blocks. As mentioned earlier SMPs can only access 16 bit PortMask entries. According to one embodiment of the present invention having a maximum of 32 ports on the switch, the entity accessing the MRT needs to know the physical port numbers associated with Logical port number 15 and logical port number 31. This helps identify the physical slice of the MRT that the entity must apply to the bit vector mapper while masking out the other bits of the complete RAM entry relating to one Multicast LID. In regard to writes to the MRT, if the number of ports on the switch is greater than 15 then the logical bit vector straddles across two position addresses. A write operation to the RAM requires a read modify write operation to only write the valid slice of the MRT. These outputs can again be used for this purpose.

Stage A 910 and Stage B 920 are replicated for all 8 ports 24 of interconnect device 20. The functionality of each stage can be localized in the preprocessor 38 or distributed throughout interconnect 20. In addition, although combinational logic is used in FIGS. 8 and 9, the functions performed by the stages can be performed purely in software or a combination of hardware and software.

Figure 10:
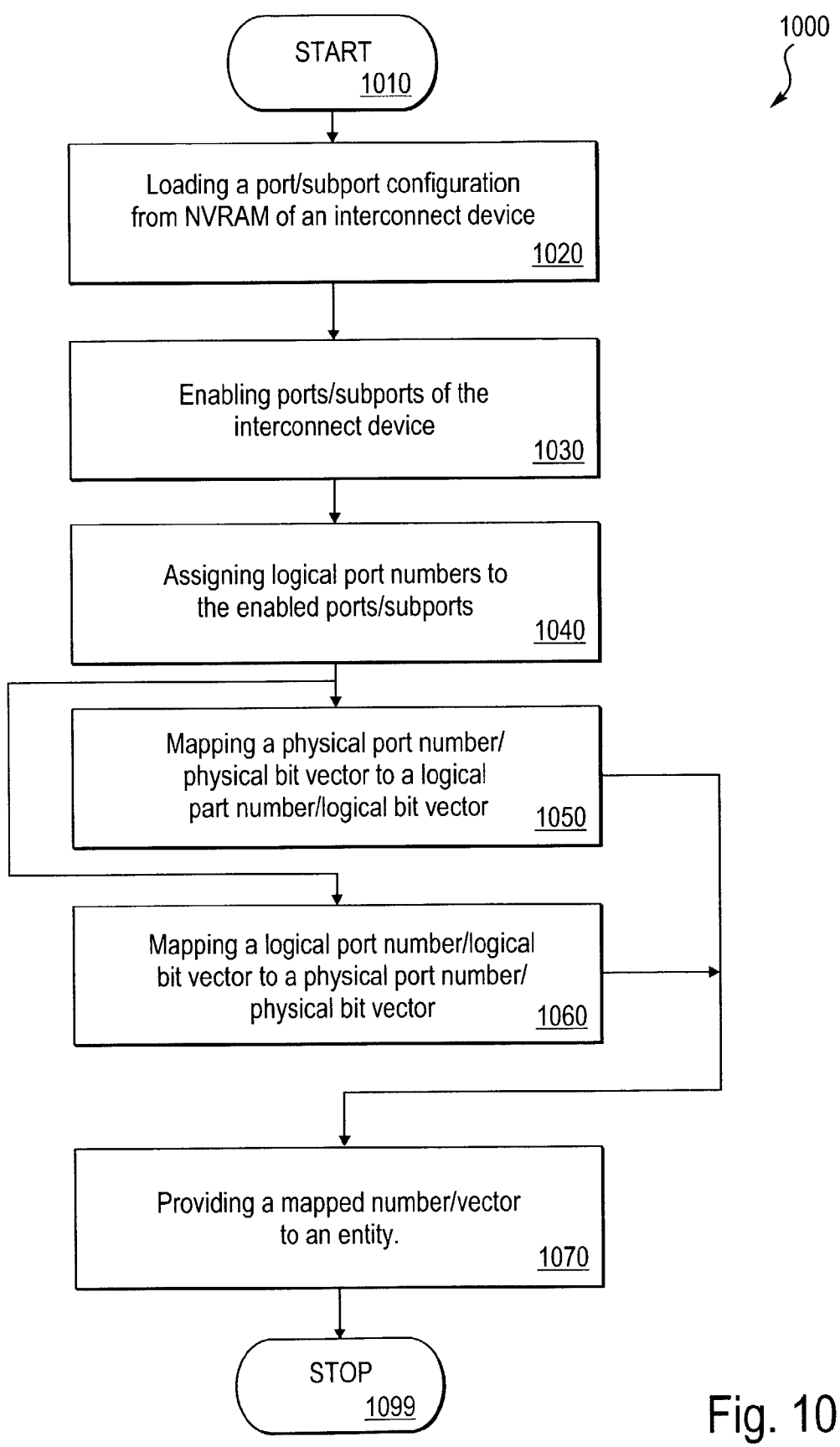
FIG. 10 is a flow chart of the process performed by a logical-physical port mapper, according to one embodiment of the present invention.

FIG. 10 is a flow chart of a common process 1000 performed by a logical-physical port mapper 800 and a logical-physical bit vector mapper 900, according to one embodiment of the present invention. The process 1000 begins at start block 1010. Flow continues to processing block 1020 where mapper 800 or mapper 900 ("the mapper") load a port/subport configuration (PCFN) from non-volatile random access memory (NVRAM) included in interconnect device 20. In parallel with the mapper's loading of PCFN, the ports 24 receive PCFN as well. The appropriate ports 24 and/or subports 50 of interconnect device 20 are enabled according to the configuration at processing block 1030.

Flow continues to process block 1040, where the mapper assigns logical port numbers to the enabled ports/subports. Depending on the type of request being serviced by the mapper, either physical to logical mapper or logical to physical mapping is performed by the mapper. At processing block 1050, a physical port number or physical bit vector is mapped to a logical port number or logical bit vector, respectively. Similarly, at processing block 1060, a logical port number or logical bit vector is mapped to a physical port number or physical bit vector, respectively.

Flow continues to processing block 1070, where the mapper provides a mapped port number or bit vector to an entity such as an arbiter using the mapper. The process ends at block 1099.

Although described with the use of arbiter 36, the mapper can be implemented in any entity that requires logical/physical mapping.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, method and system for port numbering in an interconnect device, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of port numbering in an interconnect device, comprising:
   loading a port configuration value from a memory device;
   enabling one or more ports and subports according to the configuration value;
   assigning contiguous logical port numbers to the one or more ports and subports included in the interconnect device;
   receiving a mapping request; and
   providing a mapped response associated with the mapping request to an entity.

2. The method of claim 1, wherein the mapping request is a logical bit vector and the mapped response is a physical bit vector.

3. The method of claim 1, wherein the mapping request is a physical bit vector and the mapped response is a logical bit vector.

4. The method of claim 1, wherein the mapping request is a logical port number and the mapped response is a physical port number.

5. The method of claim 1, wherein the mapping request is a physical port number and the mapped response is a logical port number.

6. A system for port numbering in an interconnect device, comprising:
   means for loading a port configuration value from a memory device;
   means for enabling one or more ports and subports according to the configuration value;
   means for assigning contiguous logical port numbers to the one or more ports and subports included in the interconnect device;
   means for receiving a mapping request; and
   means for providing a mapped response associated with the mapping request to an entity.

7. The system of claim 6, wherein the mapping request is a logical bit vector and the mapped response is a physical bit vector.

8. The system of claim 6, wherein the mapping request is a physical bit vector and the mapped response is a logical bit vector.

9. The system of claim 6, wherein the mapping request is a logical port number and the mapped response is a physical port number.

10. The system of claim 6, wherein the mapping request is a physical port number and the mapped response is a logical port number.

11. An interconnect device comprising:
    a memory device; and
    a preprocessor, wherein the preprocessor loads a port configuration value from the memory device;
    enables one or more ports and subports according to the configuration value;
    assigns contiguous logical port numbers to the one or more ports and subports included in the interconnect device;
    receives a mapping request; and
    provides a mapped response associated with the mapping request to an entity.

12. The interconnect device of claim 1, wherein the mapping request is a logical bit vector and the mapped response is a physical bit vector.

13. The interconnect device of claim 11, wherein the mapping request is a physical bit vector and the mapped response is a logical bit vector.

14. The interconnect device of claim 11, wherein the mapping request is a logical port number and the mapped response is a physical port number.

15. The interconnect device of claim 11, wherein the mapping request is a physical port number and the mapped response is a logical port number.

16. A computer-readable storage medium having stored thereon a plurality of instructions, said plurality of instructions when executed, causing said computer to perform:
    loading a port configuration value from a memory device;
    enabling one or more ports and subports according to the configuration value;
    assigning contiguous logical port numbers to the one or more ports and subports included in the interconnect device;
    receiving a mapping request; and
    providing a mapped response associated with the mapping request to an entity.

17. The computer-readable medium of claim 16, wherein the mapping request is a logical bit vector and the mapped response is a physical bit vector.

18. The computer-readable medium of claim 16, wherein the mapping request is a physical bit vector and the mapped response is a logical bit vector.

19. The computer-readable medium of claim 16, wherein the mapping request is a logical port number and the mapped response is a physical port number.

20. The computer-readable medium of claim 16, wherein the mapping request is a physical port number and the mapped response is a logical port number.

* * * * *

UNITED STATES PATENT AND TRADEMARK OFFICE
CERTIFICATE OF CORRECTION

PATENT NO. : 7,111,101 B1  Page 1 of 1
APPLICATION NO. : 10/431993
DATED : September 19, 2006
INVENTOR(S) : Daniel Bourke et al.

It is certified that error appears in the above-identified patent and that said Letters Patent is hereby corrected as shown below:

Title page, item [73] Column 1, (Assignee), Line 1, delete "Ayago" and insert -- Avago --;

Column 14, line 13, Claim 12, delete "claim 1," and insert -- claim 11, --.

Signed and Sealed this

First Day of June, 2010

David J. Kappos
*Director of the United States Patent and Trademark Office*